(12) United States Patent
Mayer et al.

(10) Patent No.: US 8,945,254 B2
(45) Date of Patent: Feb. 3, 2015

(54) GAS TURBINE ENGINE PARTICLE SEPARATOR

(75) Inventors: Jeffrey Mayer, Swampscott, MA (US); Brian Roberts, Ipswich, MA (US); Jonathan Anisko, Alexandria, VA (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 13/332,878

(22) Filed: Dec. 21, 2011

(65) Prior Publication Data
US 2013/0160411 A1 Jun. 27, 2013

(51) Int. Cl.
*B01D 39/00* (2006.01)

(52) U.S. Cl.
USPC ............. 55/306; 55/307; 55/418; 55/440; 55/441; 55/396; 55/397; 55/394; 55/385.3; 95/267

(58) Field of Classification Search
USPC .......... 55/306, 307, 418, 440, 441, 396, 397, 55/385.3, 394; 95/267; 60/39.092; 73/861.18
See application file for complete search history.

(56) References Cited

U.S. PATENT DOCUMENTS

| | | | |
|---|---|---|---|
| 3,970,439 A | 7/1976 | Murphy | |
| 3,979,903 A | 9/1976 | Hull, Jr. et al. | |
| 3,993,463 A | 11/1976 | Barr | |
| 4,047,379 A | 9/1977 | Brookes et al. | |
| 4,250,703 A | 2/1981 | Norris et al. | |
| 4,255,174 A * | 3/1981 | Simpson | 55/347 |
| 4,265,646 A | 5/1981 | Weinstein et al. | |
| 4,268,284 A | 5/1981 | Kent et al. | |
| 4,304,094 A | 12/1981 | Amelio | |
| 4,509,962 A | 4/1985 | Breitman et al. | |
| 4,524,748 A | 6/1985 | Giannotti | |
| 4,527,387 A | 7/1985 | Lastrina et al. | |
| 4,592,765 A | 6/1986 | Breitman et al. | |
| 4,617,028 A | 10/1986 | Ray et al. | |
| 4,685,942 A | 8/1987 | Klassen et al. | |
| 4,702,071 A | 10/1987 | Jenkins et al. | |
| 4,704,145 A | 11/1987 | Norris et al. | |
| 4,860,534 A | 8/1989 | Easley et al. | |
| 4,928,480 A | 5/1990 | Oliver et al. | |
| 5,125,226 A | 6/1992 | Sperinck | |
| 5,139,545 A | 8/1992 | Mann | |
| 5,201,801 A | 4/1993 | Smith, Jr. | |
| 5,222,693 A | 6/1993 | Slutzkin et al. | |
| 6,134,874 A | 10/2000 | Stoten | |
| 6,499,285 B1 | 12/2002 | Snyder | |
| 6,508,052 B1 | 1/2003 | Snyder et al. | |
| 6,698,180 B2 | 3/2004 | Snyder | |
| 6,817,572 B2 | 11/2004 | Negulescu et al. | |
| 6,907,738 B1 | 6/2005 | Berkeley et al. | |
| 6,969,237 B2 | 11/2005 | Hudson | |
| 7,374,593 B2 | 5/2008 | Snyder | |

(Continued)

OTHER PUBLICATIONS

Klump, et al., Riblets in Turbulet Flow Regimes of 2-D Compressor Blades, Proceedings of ASME Turbo Expo 2009: Power for Land, Sea and Air, Jun. 8-12, 2009, pp. 1-10, GT2009-59352, American Society of Mechanical Engineers, USA.

*Primary Examiner* — Dung H Bui
(74) *Attorney, Agent, or Firm* — General Electric Company; James E. Cole

(57) ABSTRACT

Embodiments of the present invention provide an inlet particle separator for a gas turbine engine having an inlet flow path, a scavenge flow path, a core flow path, and a flow splitter disposed between the scavenge and core flow paths. A plurality of grooves may be disposed about an inner surface of a wall of the separator within the inlet flow path.

17 Claims, 10 Drawing Sheets

(56) References Cited

U.S. PATENT DOCUMENTS

| | | |
|---|---|---|
| 7,581,397 B2 | 9/2009 | Strangman et al. |
| 7,608,122 B2 | 10/2009 | Snyder |
| 7,678,165 B2 | 3/2010 | Tingle et al. |
| 7,802,433 B2 | 9/2010 | Higgins |
| 7,967,554 B2 | 6/2011 | Bremer |
| 8,015,787 B2 | 9/2011 | Snyder |
| 2003/0024232 A1 | 2/2003 | Snyder et al. |
| 2003/0024233 A1 | 2/2003 | Snyder |
| 2003/0113205 A1 | 6/2003 | Negulescu et al. |
| 2005/0047902 A1 | 3/2005 | Hudson |
| 2007/0095033 A1 | 5/2007 | Snyder |
| 2007/0186534 A1 | 8/2007 | Snyder |
| 2007/0235373 A1 | 10/2007 | Strangman et al. |
| 2008/0047425 A1 | 2/2008 | Loda et al. |
| 2008/0072606 A1 | 3/2008 | Higgins |
| 2008/0141649 A1 | 6/2008 | Petrowicz et al. |
| 2008/0152500 A1 | 6/2008 | Mehring |
| 2008/0156187 A1 | 7/2008 | Tingle et al. |
| 2008/0310951 A1 | 12/2008 | Bremer |
| 2009/0145101 A1 | 6/2009 | Suciu et al. |
| 2010/0104422 A1 | 4/2010 | Martel et al. |
| 2010/0162682 A1 | 7/2010 | Lerg |
| 2010/0221100 A1 | 9/2010 | Snyder |
| 2011/0067409 A1 | 3/2011 | Beeck |
| 2011/0179763 A1 | 7/2011 | Rajamani et al. |
| 2011/0247345 A1 | 10/2011 | Laurello et al. |
| 2011/0247347 A1 | 10/2011 | Ebert et al. |
| 2011/0250057 A1 | 10/2011 | Laurello et al. |
| 2011/0265650 A1 | 11/2011 | Kazlauskas et al. |
| 2012/0204726 A1* | 8/2012 | McAdams et al. .......... 96/182 |

* cited by examiner

GAS TURBINE ENGINE PARTICLE SEPARATOR

TECHNICAL FIELD

This invention generally pertains to particle separators for a fluid flow in a gas turbine engine.

BACKGROUND

Gas turbine engines can be used in a wide variety of environments. In some of these environments, air pulled into a gas turbine engine may contain an amount of particulate matter. This particulate matter may include, for example, sand, dirt, dust, salt, or water. This particulate matter can impinge upon internal components of a gas turbine engine and damage or corrode those components, which can therefore shorten the operating life or efficiency of that engine. Accordingly, one aspect of the claimed invention is to provide efficient separation of particulate matter from incoming air, so as to eject this particulate matter from the engine before it reaches damageable internal components.

SUMMARY

One embodiment of the present invention provides an inlet particle separator disposed on a forward portion of a gas turbine engine, forward of the engine core components, such as the compressor, combustor, and turbine. The separator ingests a fluid flow containing particulate matter. The separator has a plurality of grooves disposed on an interior wall in such a manner that a majority, if not all, of the particulate matter in the ingested fluid flow impacts with the grooves. The impact with the grooves reduces the rebound velocity and rebound angle of the particulate matter, thereby making it easier to scavenge that particulate matter from the primary engine fluid flow and exhaust it to bypass critical engine components via a scavenge flow path, bypassing the engine core. The remaining portion of the ingested fluid flow containing little, if any, of the particulate matter is taken in by a core flow path and directed to the engine core.

Another aspect of the scavenge system provides a particle separator for a gas turbine engine which may have an annular inlet flow path, an annular scavenge flow path, an annular core flow path, and a circumferential flow splitter disposed between the scavenge and core flow paths. A plurality of grooves may be disposed about an inner surface within the inlet flow path to aid in particle scavenging.

Another embodiment of the scavenge system may include scavenge and primary flow paths that are non-annular.

Yet another embodiment of the scavenge system provides grooves positioned on an inner wall surface with an aspect ratio between base and height dimensions of the groove. This aspect ratio may vary along a length of the grooves.

Still another embodiment of the scavenge system provides grooves disposed on an inner wall surface with the grooves having sidewalls positioned on an inner wall surface having linear or non-linear sidewall profiles. These sidewall profiles may vary along a length of the grooves.

Further aspects may include grooves disposed on an inner wall surface with the grooves having a root, a first tip, a second tip, a first sidewall extending between the root and first tip, and a second sidewall extending between the root and second tip. The first tip and/or the first sidewall may shroud or conceal the root from an oncoming flow of particulate matter.

BRIEF DESCRIPTION OF THE ILLUSTRATIONS

Embodiments of the invention are illustrated in the following illustrations.

DETAILED DESCRIPTION

A typical gas turbine engine generally possesses a forward end and an aft end with its several components following inline therebetween. An air inlet or intake is at a forward end of the engine and may have an integral particle separator incorporated therein. Moving toward the aft end, in order, the intake is followed by a compressor, a combustion chamber, a turbine, and a nozzle at the aft end of the engine. It will be readily apparent from those skilled in the art that additional components may also be included in the engine, such as, for example, low-pressure and high-pressure compressors, high-pressure and low-pressure turbines, and an external shaft. This, however, is not an exhaustive list. An engine also typically has an internal shaft axially disposed through a center longitudinal axis of the engine. The internal shaft is connected to both the turbine and the air compressor, such that the turbine provides a rotational input to the air compressor to drive the compressor blades. A typical gas turbine engine may also be considered to have an outer circumference, as they are typically cylindrical in shape.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Figure 1:
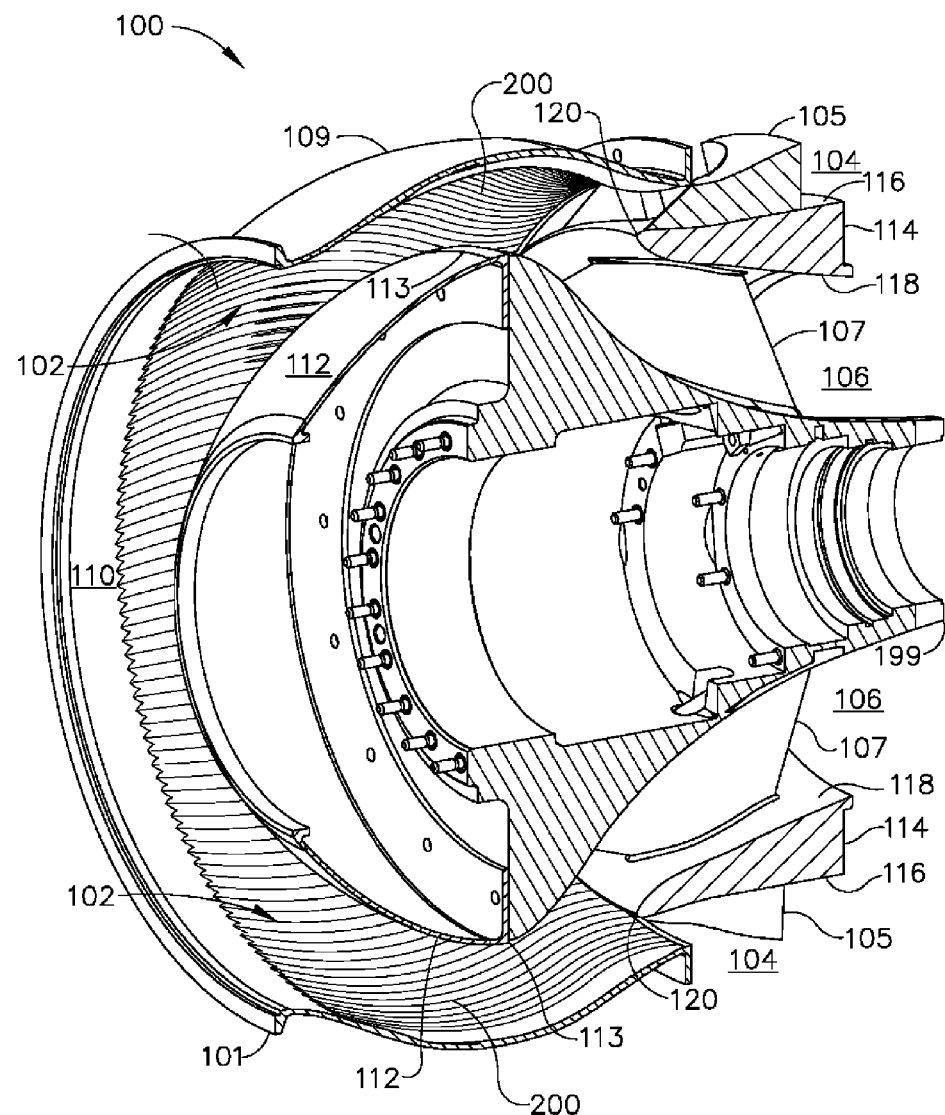
FIG. 1 is a perspective illustration of a cross-section of an embodiment of a particle separator of the present invention.
Figure 2:
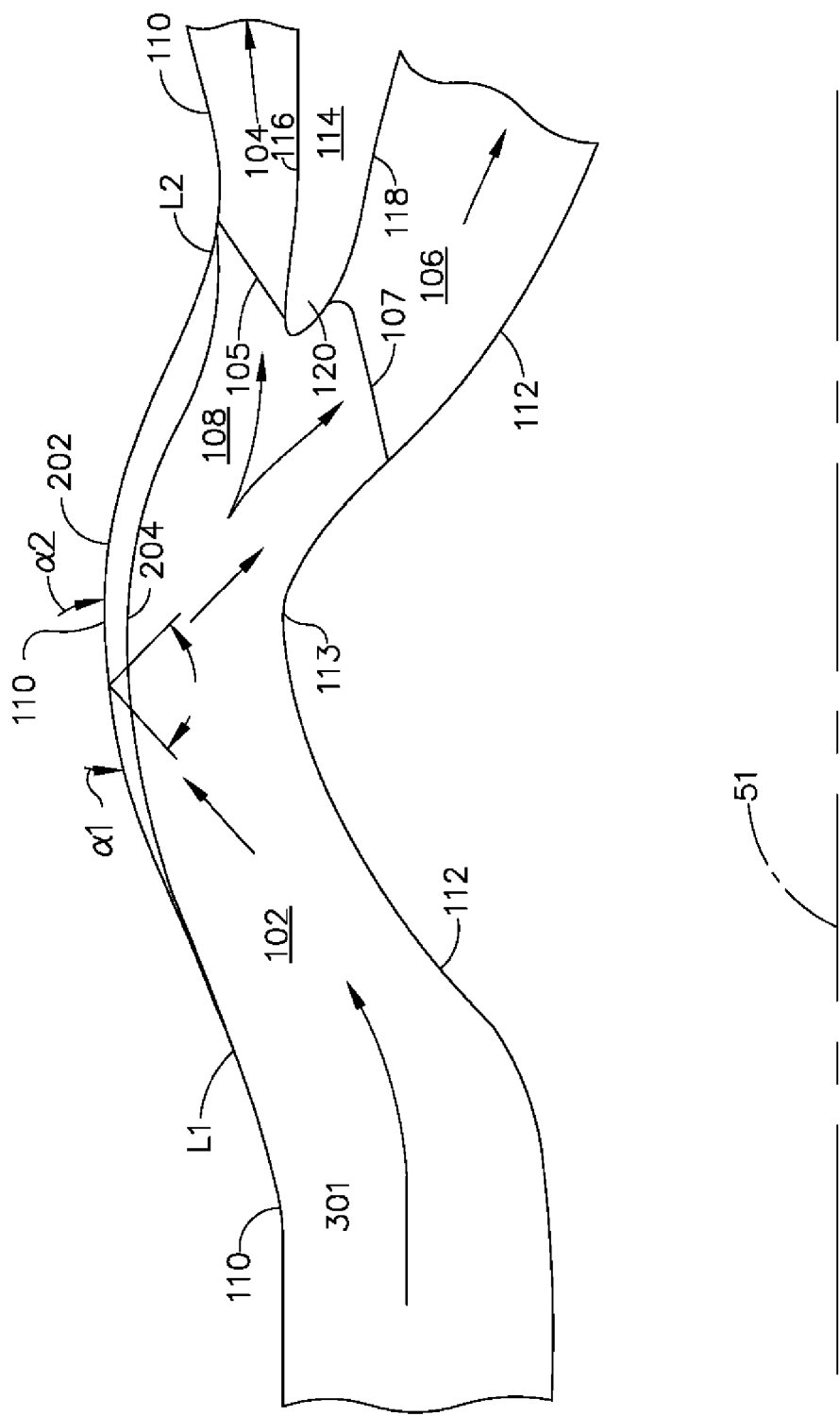
FIG. 2 is a side cross-section of an embodiment of a particle separator of the present.
Figure 8:
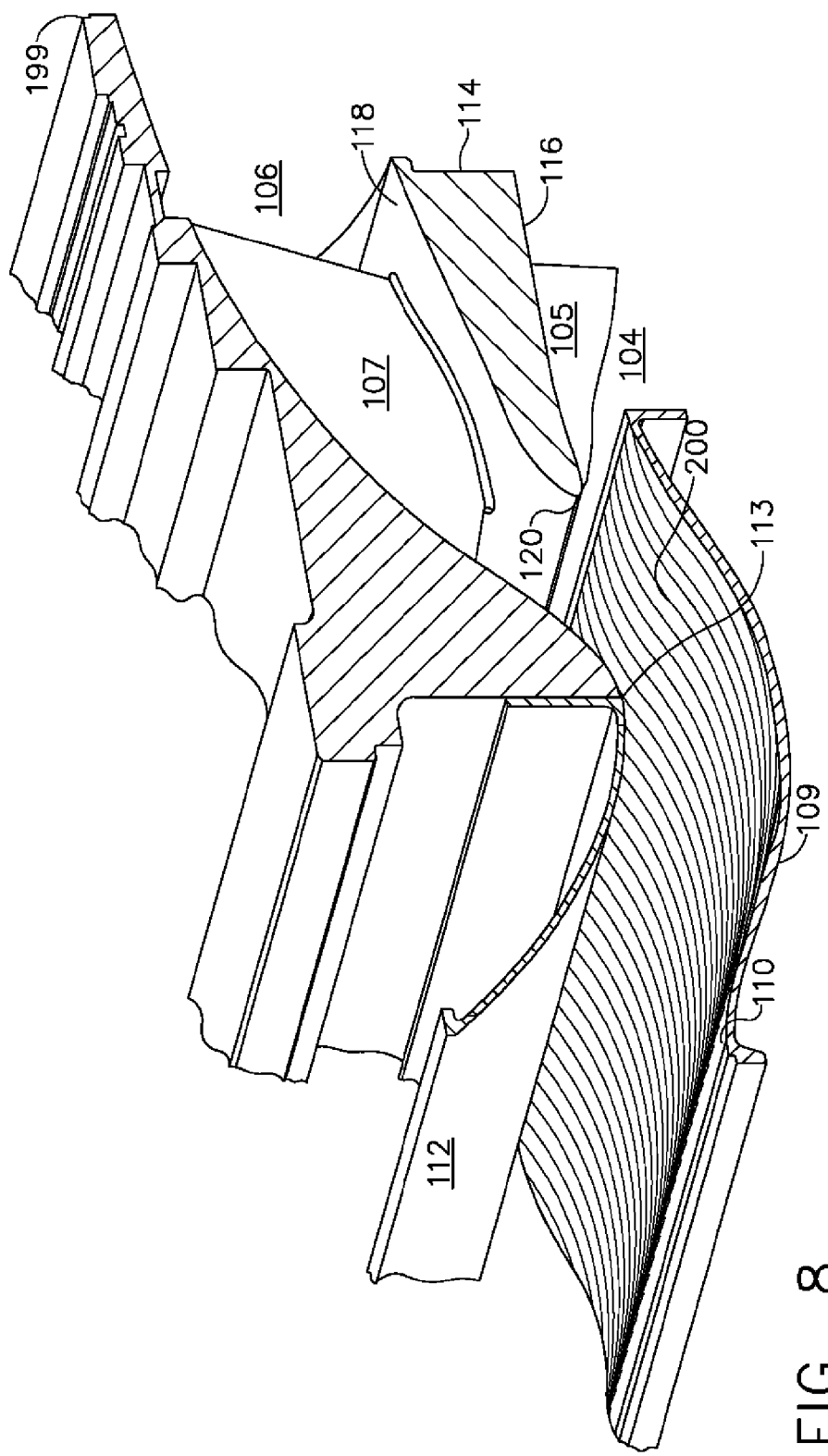
FIG. 8 illustrates an embodiment of a particle separator of the present invention having a non-annular cross-section.

Embodiments of a particle separator 100 may provide generally annular flow paths. Annular flow paths may be defined by surfaces with that are generally circumferential so as to have a cross-section, as taken along a plane orthogonal to the longitudinal axis, with a generally curved closed surface. These circumferential surfaces may share a common central longitudinal axis, and their associated cross-sections may be circular. For the sake of simplicity and explanation, the embodiments of a particle separator shown in FIGS. 1 and 2 provide generally annular flow paths with the surfaces that define them having a common longitudinal axis. However, it is not necessary for all surfaces be exactly circular or the flow paths to be annular in cross-section and they may even take non-circular or non-annular shapes. For example, FIG. 8 depicts a particle separator with non-circumferential surfaces and non-annular flow paths. In addition circumferential surfaces and annular flow paths do not need to share a common central longitudinal axis. Furthermore, it is to be understood that the flow paths described herein may be broken into several ducts or, at the very least, have structural elements or vanes disposed therein. Moreover, the grooves depicted in 3-7 may be utilized in any embodiment of a particle separator, including annular and non-annular configurations, and on other surfaces.

Referring to FIGS. 1 and 2, an embodiment of an inlet particle separator 100 is provided. The particle separator 100 will ingest a fluidized flow, such as air, containing an amount of particulate matter through the first end 101 and into an inlet flow path 102. The inlet flow path may be defined by a first inner surface 110 of an outer circumferential wall 109 and a second inner surface 112 of an inner circumferential wall 111. Grooves 200 may be disposed on the outer circumferential wall surface 110. However, grooves 200 may also be disposed on a forward portion of the second inner surface 112. The geometry of the second inner wall surface 112 directs the ingested fluidized flow containing the particulate matter toward the grooves 200 on the first inner wall surface 110. The first inner wall surface 100 and the grooves 200 disposed thereon then direct the particulate matter to the scavenge flow path 104 and the clean flow to the core flow path 106. A majority, if not all, of the particulate matter then impacts the groove sidewalls 206, 208 (See FIGS. 3-7) one or more times. Each impact reduces the particulate velocity and rebound angle α2 such that multiple impacts reduce the velocity and rebound angle α2 to a greater extent than a single impact on a smooth surface of other known inlet particle separators. A first outlet or scavenge flow path 104 is disposed near the first wall surface 110 and adjacent the inlet flow path 102 and the separator second end 199. Due to the proximity of the scavenge flow path 104 to the inlet flow path 102 and first wall surface 110, the continuous fluid flow through the separator 100 carries the slowed particulate matter into the scavenge flow path 104. The scavenge flow path 104 exhausts from the engine a great majority, if not all, of the particulate matter that enters the particle separator 100. The remaining fluidized flow, now separated from a majority, if not all, of the particulate matter, flows into the second outlet or core flow path 106. The core flow path 106 directs this cleaned fluidized flow out of the particle separator and into the engine core components, such as the compressor, combustor, and turbine.

Referring now to FIGS. 1 and 2, an embodiment of a particle separator 100 is provided for a gas turbine engine. The engine may have a longitudinal axis 51 disposed axially through its center. The particle separator 100 is preferably disposed in a forward section of a gas turbine engine and preferably disposed between the engine's intake (not shown) and compressor (not shown), with the separator 100 being in fluid communication with both.

The particle separator 100 has a first end 101 and an axially opposed second end 199. The first end 101 may be provided with an appropriate flange for mating with a marman clamp or other ring clamp. This structure facilitates mounting the inlet particle separator 100 to an airframe or other forward engine components such as an inlet shroud. The separator also has an inlet flow path 102 adjacent to the first end 101, a scavenge flow path 104 adjacent to the second end 199, and a core flow path 106 adjacent to the second end 199.

A flow splitter 114 may be disposed adjacent to the second end 199 between the scavenge and core flow paths 104, 106, thereby separating the flow paths 104, 106. The flow splitter 114 may be generally circumferential and provided with a first splitter surface 116 and a second splitter surface 118. The first splitter surface is shown to be radially distal of the second splitter surface 118. The splitter 114 may also have a leading edge 120 that acts to divert a fluidized flow between the scavenge flow path 104 and the core flow path 106.

The inlet flow path 102 is in fluid communication with the engine intake (not shown). The inlet flow path 102 may be generally annular and preferably at least partially defined by and bound by a portion of a first inner circumferential wall surface 110 of an outer circumferential wall 109, and a portion of a second inner circumferential wall surface 112 of an inner circumferential wall 111. The first wall surface 110 is radially distal of the second wall surface 112 in relation to a longitudinal axis 51 of the engine 50. However, the inlet flow path 102 may also be a series of ducts or have other structural elements disposed therein.

The scavenge flow path 104 is in fluid communication with the inlet flow path 102 and also in communication with an engine outlet (not shown). Such an engine outlet should expel the particulate-laden air flow that is directed into the scavenge flow path 104 so as to exhaust it from the engine and bypass the engine core (not shown). The scavenge flow path 104 may be generally annular and preferably be at least partially defined and bound by a portion of the first wall surface 110, and be at least partially defined and bound by at least a portion of the first splitter surface 116. The first outer circumferential surface 110 is radially distal of the first splitter surface 116. The scavenge flow path 104 may also be a series of ducts or have other structural elements, such as scavenge vanes 105, disposed therein. These scavenge vanes 105 may be provided to directed the particulate-laden fluid flow to an engine outlet to exhaust it from the engine, as well as to provide structural support.

The core flow path 106 is in fluid communication with the inlet flow path 102 and also in fluid communication with the engine core, such as to provide particulate free air to the engine core. The core flow path 106 may be generally annular and preferably be at least partially defined and bound by a portion of the second wall surface 112, and be at least partially defined and bound by at least a portion of the second splitter surface 118. Alternatively, the core flow path 106 may be generally cylindrical and may be at least partially defined and bound by at least a portion of the second splitter surface 118.

The core flow path 106 may also be a series of ducts or have other structural elements, such as core struts 107, disposed therein.

The inlet flow path 102 may start at a first radial position at the separator first end 101 and then progress radially outward such as to direct an ingested fluidized flow containing particulate matter into the first wall surface 110 and its associate grooves 200 (discussed herein). The inlet flow path 102 at the separator first end 101 may be generally straight along the longitudinal axis 51 before directing the flow into the first wall surface 110. To accomplish this flow direction, the second wall surface 112 may have a first diameter or associated circumference or perimeter at the first end 101 of the separator 100. At some point along the longitudinal axis 51, the second wall surface 112 diameter, circumference, or perimeter increases in size moving axially aft. At a position axially forward of the splitter 114, the second wall surface 112 reaches an apex 113, where the second wall surface 112 reaches a maximum diameter, circumference, or perimeter. The second wall apex 113 may be located at a rain step. Moving axially aft of this apex 113, the second wall surface 112 decreases in diameter or perimeter and leads into the core flow path 106. In other words, the second wall surface 112 may have a form that is generally curved or hump-shaped as viewed from a cross-section along the engine central longitudinal axis 51. This curved shape facilitates directing the ingested fluidized flow containing particulate matter into the first wall surface 110 and its associated grooves 200.

In various embodiments, the first wall surface 110 may mimic the geometry of the second wall surface 112. Similar to the second wall surface 112, the first wall surface 110 may have a first diameter or associated circumference or perimeter at the separator first end 101. Along the longitudinal axis 51, the first wall surface 110 diameter, circumference, or perimeter increases in size moving axially aft. At a position axially forward of the splitter 114, the first wall surface 110 reaches an apex, where the first wall surface 110 reaches a maximum diameter, circumference, or perimeter. Moving axially aft of this apex, the first wall surface 110 decreases in diameter or perimeter to direct an incoming airflow toward the splitter 114 and first and core flow paths 104, 106. In other words, the first wall surface 110 may have a form that is generally curved or hump-shaped as viewed from a cross-section along the engine central longitudinal axis 51.

It is understood that while the first wall surface 110 and second wall surface 112 are both generally hump-shaped, it is not necessary that they have identical profiles. The radial distance between the first and second wall surfaces 110, 112 may vary. Accordingly, the points at which the two surfaces 110, 112 begin to increase in perimeter may not coincide along an axial dimension of the separator 50, nor will their respective apexes necessarily coincide. The first and second wall surfaces 110, 112 act together such that the second wall surface 112 directs the flow toward the first wall surface 110. The first wall surface 112 reflects the flow into a flow turn that is forward of the flow splitter 114 and aft of the apex 113. The exact profile shapes of the first and second wall surfaces 110, 112 may depend upon the anticipated operating environment of the turbine, the air flow requirements for the turbine, the requirements of installation of the separator 100 to an aircraft, and inlet constraints.

As shown in FIGS. 1 and 2, the first wall surface 110 preferable has a plurality of grooves 200 along its circumferential perimeter, and preferable disposed in an array with all the grooves 200 being substantially identical to one another and equally annularly spaced about the first wall surface 110. Each groove 200 may be disposed axially in a manner parallel to the longitudinal axis, such that a path followed by any groove tip 204 follows a path that is disposed on a plane that coincides with the longitudinal axis 51. Alternatively, the plurality of grooves 200 may possess a curved, spiral, or helical geometry. Such geometry may provide grooves 200 that resemble a slightly threaded pattern or that of a slight corkscrew. The degree of the groove curvature may depend on the degree of swirl present in the incoming fluidized flow, which is defined by how much axial and tangential velocity is present in the fluidized flow.

Referring to FIG. 4, each groove 200 has a first end L1 and an axially opposed second end L2 with a length therebetween. The groove first end L1 is disposed within the inlet flow path 102 and may be located generally at any point forward, in relation to the longitudinal axis 51, of the first wall surface 110 apex. The groove second end L2 may generally be disposed, in relation to the longitudinal axis 51, near the splitter leading edge 120. The exact location and orientation of the first and second ends L1, L2 depend upon the anticipated operating environment of the turbine, the air flow requirements for the turbine, the requirements of installation of the separator 100 to an aircraft, and inlet constraints.

Figure 3:
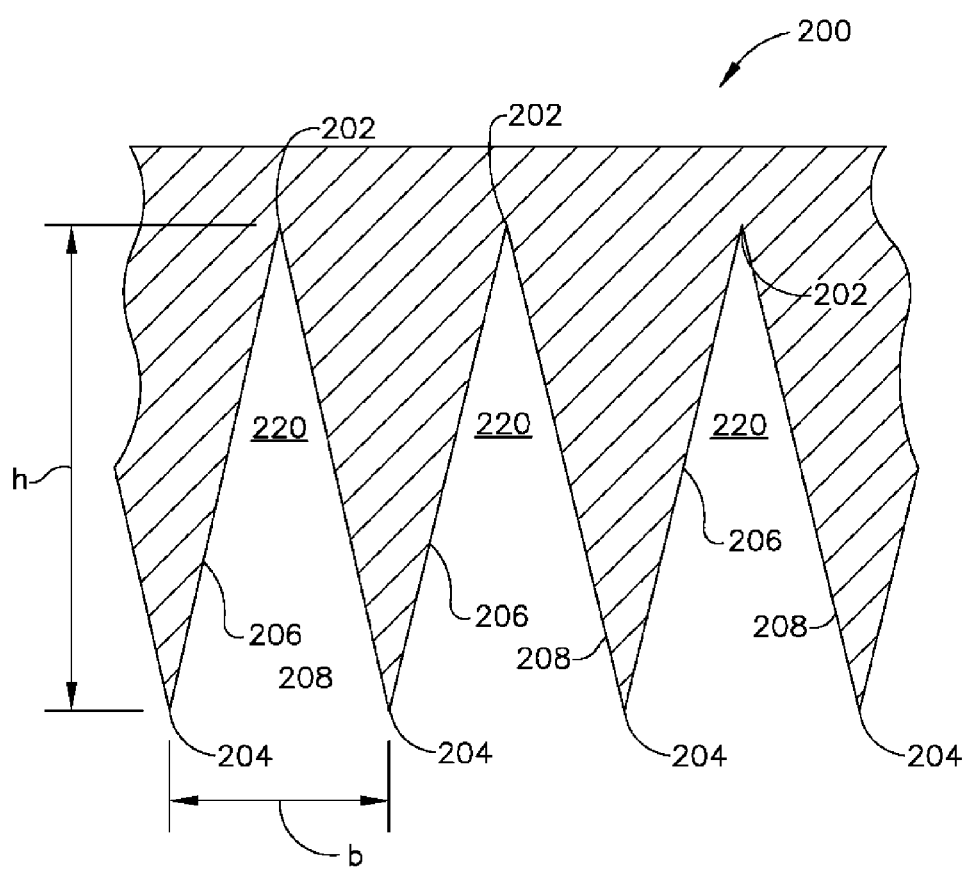
FIG. 3 is a cross-sectional view taken along a plane orthogonal to a longitudinal axis of those grooves of an embodiment of grooves that may be used in embodiments of the present invention.

Referring now to FIG. 3, a general profile of one embodiment of grooves is shown as a cross-section taken in a plane orthogonal to a longitudinal axis of those grooves 200. Each groove 200 is provided with a root 202, two tips 204, a first sidewall 206 and a second sidewall 208 with a groove flow path 220 therebetween. Further, each groove 200 shares a tip 204 with the adjacent groove 200. Each groove 200 is defined with a base dimension b between each tip 204, and a height dimension h between the root 202 and tip 204.

Analysis shows that particulate matter directed into the groove 200 will enter the groove flow path 220 and impact the sidewalls 206, 208 several times before leaving the groove flow path 220. The particulate matter enters the groove flow path 220 at an initial velocity, and each impact with the sidewalls 206, 208 decreases the particulate matter velocity. Accordingly, a greater number of impacts yield a lower exiting velocity. The lower the exit velocity, the greater the chance that the particulate matter will be carried into the scavenge flow path 104 and exit the engine 50 and not reach the engine core where it can damage engine components. The particulate-groove impacts may be either elastic or inelastic depending on the particulate material, the groove 200 material or any coatings applied to the grooves 200, or a combination thereof.

In addition, a greater number of impacts yield a lower rebound angle $\alpha 2$ (see FIG. 2). Particulate matter that exits the groove flow path 220 at a lower rebound angle $\alpha 2$ will be scavenged into the first exit flow path 106 and exit the engine and not reach the engine core where it can damage engine components. Generally, the higher the impact angle $\alpha 1$ (see FIG. 2), the higher the rebound angle $\alpha 2$. The particulate matter that impacts the forward curved portion of the second wall surface 112 will enter the groove flow path 220 at higher impact angles $\alpha 1$. Therefore, it is preferable that the particulate matter impact the groove sidewalls 206, 208 many times to reduce this rebound angle $\alpha 2$.

Each groove has an aspect ratio of the base dimension b to the height dimension h. A lower b/h ratio will generally require particulate matter to impact the sidewalls 206, 208 more times than a relatively higher b/h ratio. For example, a groove 200 with a b/h ratio of 0.5 has shown to result with incoming particulate matter impacting the sidewalls 206, 208 more times than a groove 200 with a b/h ratio of 0.8. This b/h aspect ratio may vary along the length of the grooves 200. Referring back to FIG. 2, a portion of first wall surface 110 is also designated as the root 202 of a groove between the groove first end L1 and the groove second end L2. Between these same points is a line designating the tip 204 of a groove 200. A height may be calculated as a distance between these lines 202, 204 along a radial axis that is perpendicular to the longitudinal axis 51. As can be seen, the height of the groove is variable along its length. Similarly, the base may also vary along the length of a groove.

For simplicity, the grooves 200 of FIG. 3 are shown disposed generally planar to one another, such that all roots 202 are disposed along a common plane. However, this profile may also be used on a generally circumferential surface such as that found in a turbine engine 50. The grooves 200 of FIG. 3 also have skew angle of 0°, meaning that a line that bisects an angle between the sidewalls 206, 208 is perpendicular to the plane in which the roots 202 are disposed. The grooves shown have relatively sharp points at the roots 202 and tips 204.

Figure 4A:
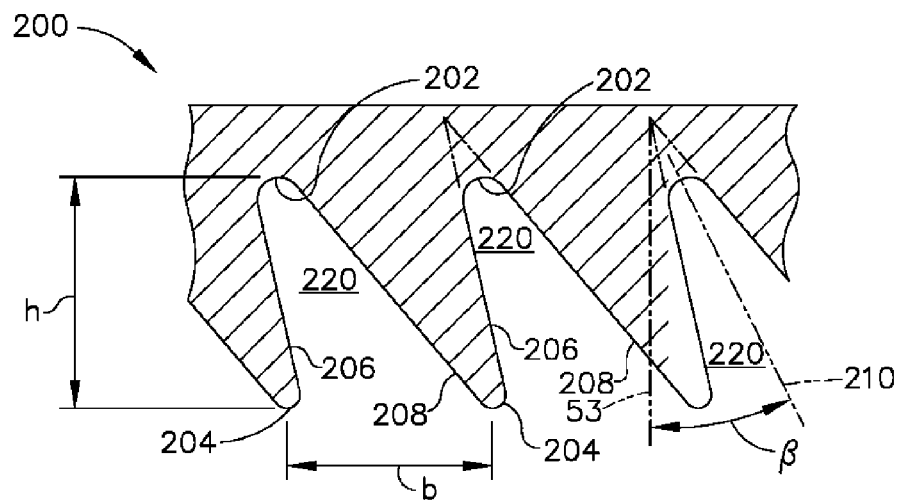
FIGS. 4A and 4B show cross-sections of embodiments of grooves taken along a plane orthogonal to a longitudinal axis of those grooves, which may be used in embodiments of the present invention.
Figure 4B:
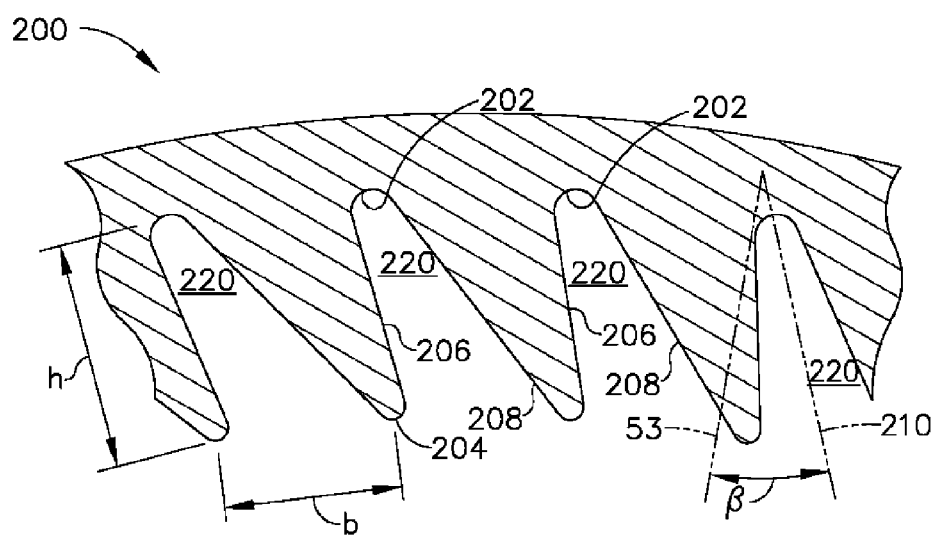

Referring now to FIGS. 4A and 4B, alternative embodiments are depicted. The grooves of FIGS. 4A and 4B are provided with the same components as those shown in FIG. 3 with slight reconfiguration. For instance, the grooves 200 shown in FIGS. 4A and 4B are provided with wider fillets and rounded roots 202 and tips 204 as compared to the sharp roots and tips of the grooves shown in FIG. 3. The grooves in FIGS. 4A and 4B are also provided with a non-zero skew angle $\beta$. FIG. 4A depicts grooves 200 disposed generally planar to one another, such that all roots 202 are disposed along a common line. FIG. 4B depicts grooves 200 disposed on a curved surface, such as what may be found in a gas turbine engine.

The grooves 200 may have a rounded root 202 defined by a radius, with each sidewall 206, 208 being generally tangent to the root 202. In addition, the grooves 200 may also have a rounded tip 204 defined by a radius, with each sidewall 206, 208 being generally tangent to the tip 204. It is preferable, but not required, for the tip 204 radius to be smaller than the root 202 radius. In practice, it may be beneficial for the tip 204 radius to be as small as possible, this decreases the likelihood that a particle will impact the tip 204 and rebound into the main separator flow without entering the groove flow path 220.

The grooves 200 may also have a non-zero skew angle $\beta$. The skew angle $\beta$ is the angle between a line 210 bisecting the angle between the sidewalls 206, 208 and a radial line 53 that extends from the longitudinal axis 51 through an intersection point of lines extending from the sidewall 206, 208 linear profiles. In FIG. 4A, the radial line 53 is represented as a line perpendicular to a line on which the roots 202 are disposed.

This configuration gives the groove 200 a shrouded sidewall 206 and an exposed sidewall 208. The shrouded sidewall 206 partially, if not entirely, conceals the root 202, such that a particle traveling along a radial line 53 from the longitudinal axis 51 will not be able to impact the root 202 without first impacting and rebounding off of the exposed sidewall 208. A concealed root 202 prevents a particle that is travelling along a radial axis 53 from simply impacting the root 202 and rebounding out of the groove flow path 220 without impacting a sidewall 206, 208. Because of the angle of a linear shrouded sidewall 206, the exposed sidewall 208 should take all initial impacts from particles traveling along a radial line 53 into the groove flow path 220. This arrangement helps to ensure that no particle will rebound out of the groove 200 without multiple impacts with the sidewalls 206, 208.

Figure 5A:
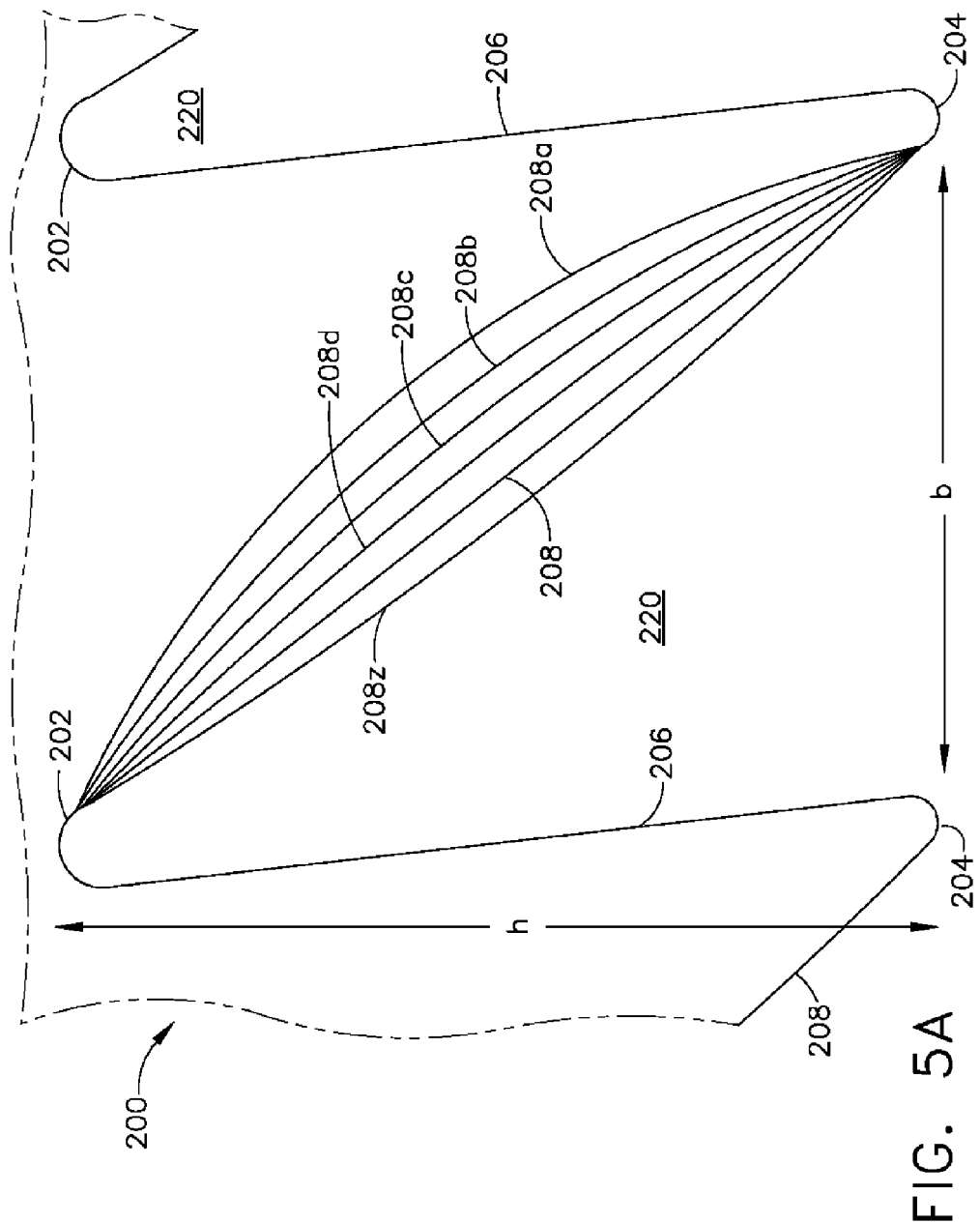
FIGS. 5A and 5B illustrate cross-sections of embodiments of grooves taken along a plane orthogonal to a longitudinal axis of a gas turbine engine that detail a variety of profiles that an exposed sidewall of embodiments of a groove may possess.
Figure 5B:
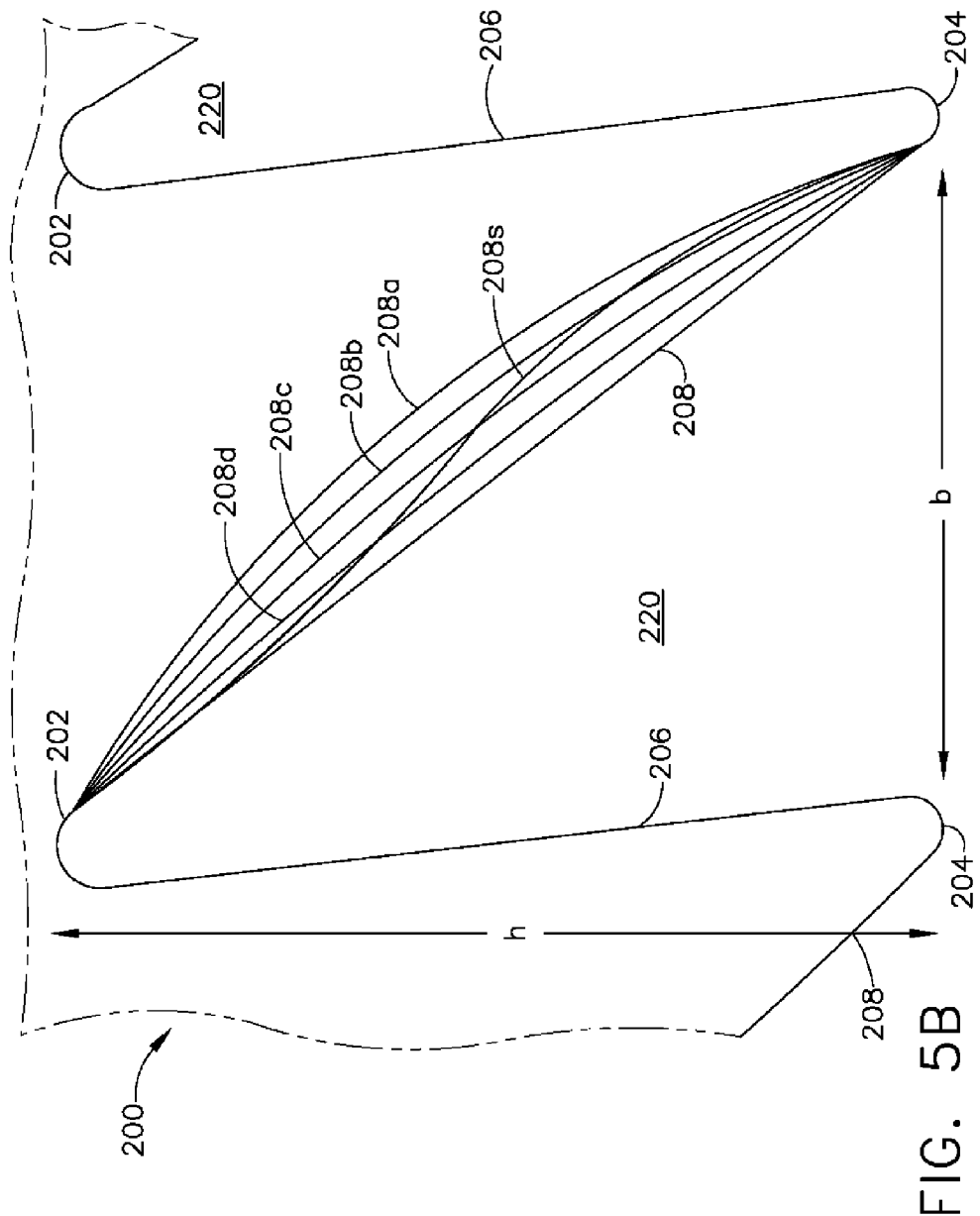

Referring now to FIGS. 5A and 5B, a variety of possible profiles are shown for an exposed sidewall 208. The exposed sidewall 208 may possess a generally concave profile 208a, 208b, 208c, 208d; a linear profile 208; or a generally convex profile 208z. As shown in FIG. 5B, the exposed sidewall may also be provided with a complex curved sidewall 208s, such as a $3^{rd}$ degree spline. Preferably, any chosen sidewall profile 208, 208a, 208b, 208c, 208d, 208s, 208z will be tangent to the root 202 and tip 204 radii.

Figure 6A:
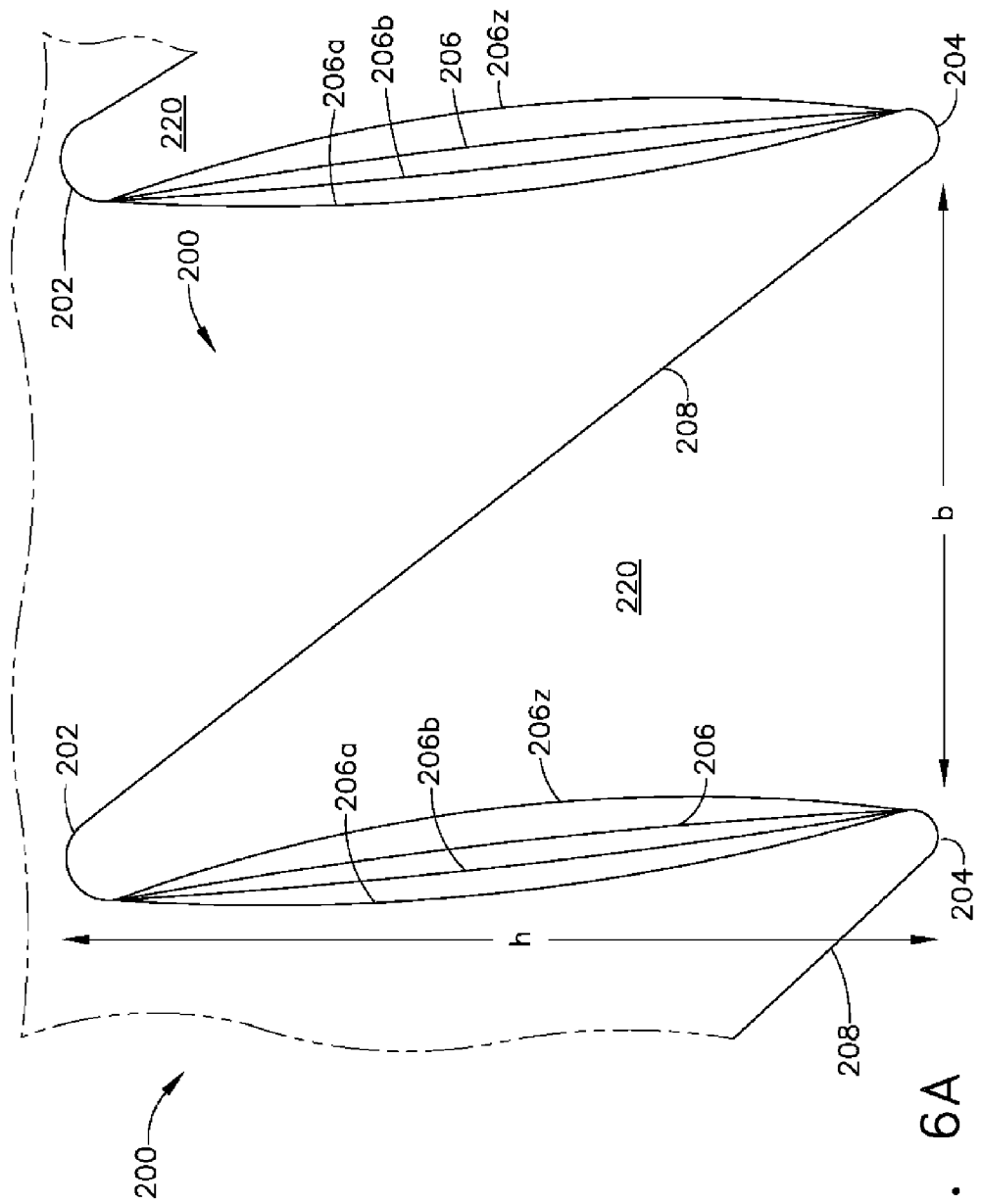
FIGS. 6A and 6B are cross-sectional views of embodiment of grooves taken along a plane orthogonal to a longitudinal axis of a gas turbine engine that detail a variety of profiles that a shrouded sidewall of embodiments of a groove may possess.
Figure 6B:
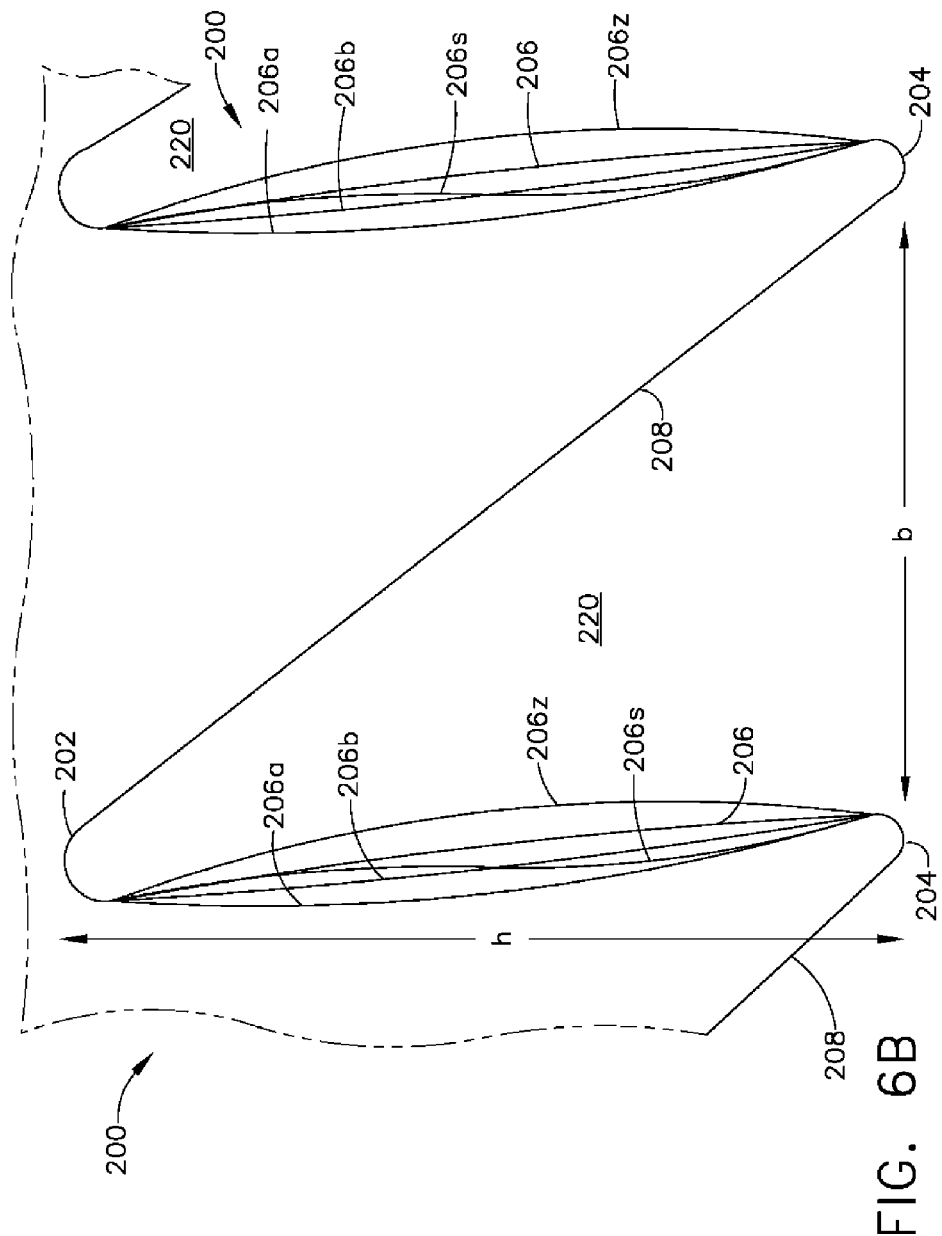

Referring now to FIGS. 6A and 6B, a variety of possible profiles are shown for a shrouded sidewall 206. The shrouded sidewall 206 may possess a generally concave profile 206a, 206b; a linear profile 206; or a generally convex profile 206z. As shown in FIG. 6B, the shrouded sidewall may also be provided with a complex curved sidewall 206s, such as a $3^{rd}$ degree spline. Preferably, any chosen sidewall profile 206, 206a, 206b, 206s, 206z will be tangent to the root 202 and tip 204 radii. While the exposed sidewalls 208 in FIGS. 6A and 6B are shown a having a linear profile, the exposed sidewalls 208 may take any multitude of shapes as shown in FIGS. 5A, 5B, and 7, regardless of the shrouded sidewall 206 profile.

Figure 7:
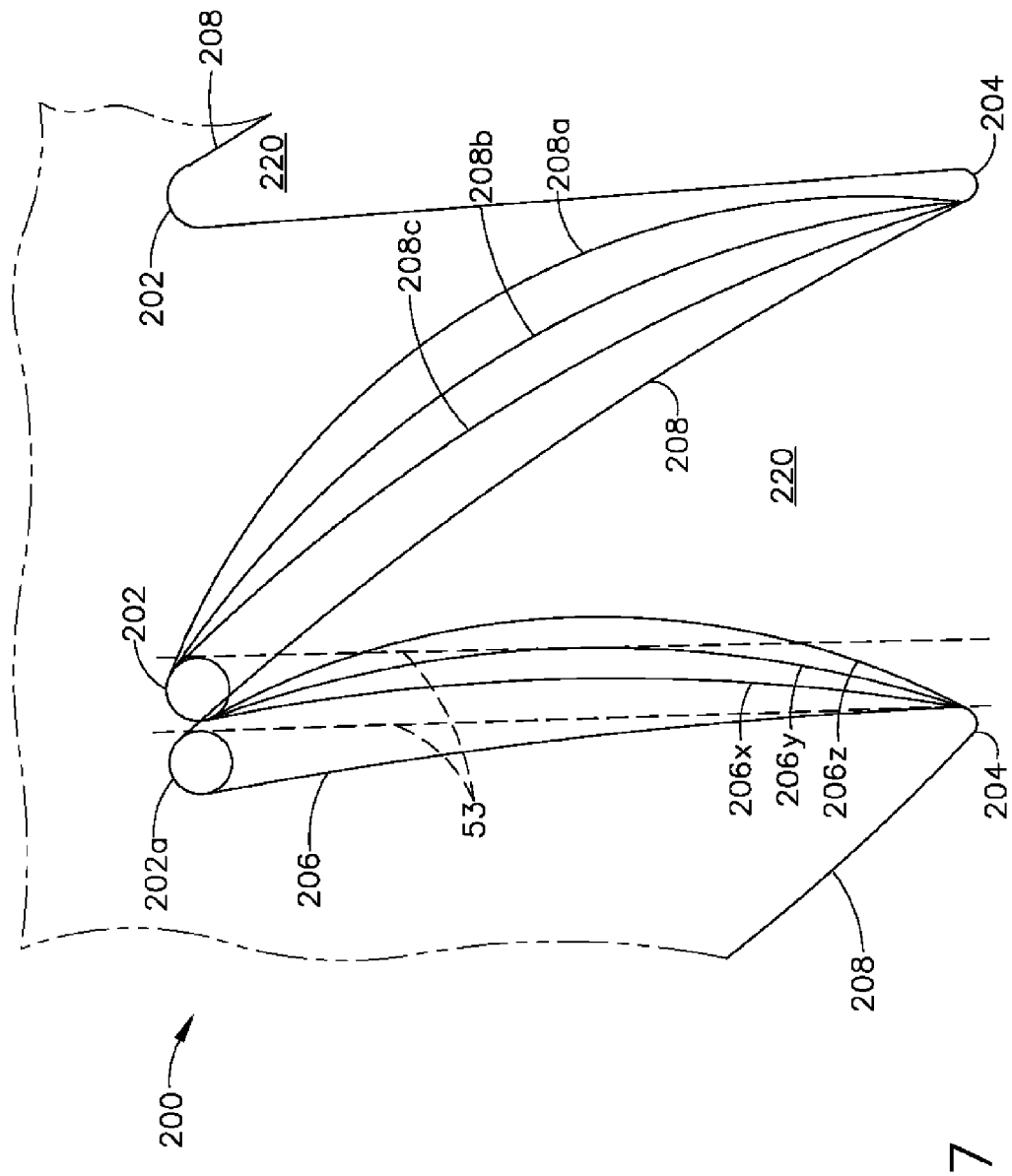
FIG. 7 is a cross-sectional view of embodiment of grooves taken along a plane orthogonal to a longitudinal axis of a gas turbine engine that show different profiles on both shrouded and exposed sidewalls and also depicts how these profiles can determine placement of a groove root.

Referring now to FIG. 7, several sidewall profile configurations are shown for concealing the root 202. Once a b/h aspect ratio is determined, the tips 204 will be fixed with respect to the adjacent tip 204 based on the chosen base dimension b and with respect to the adjacent root 202 based on the chosen height dimension h. Once the tips 204 are set in place, the exact location of the root 202 must be chosen. The root 202 placement is determined by the degree of concealment required and the profile desired for the shrouded sidewall 206. Regardless of what shrouded sidewall profile 206, 206x, 206y, 206z is chosen to completely conceal the root 202, a radial axis 53 should be tangent with both the root 202 and a point on the farthest extent of the shrouded sidewall extending into the groove flow path 220 (this may be on the curved sidewall profile or on the tip 204 radius). However as stated, the placement of the root 202 depends on the desired level of concealment. Therefore, the root 202 may be disposed on either side of the shown radial axes 53 with a position towards the left of the FIG. 7 providing more concealment than a position to the right of the FIG. 7.

As an example, should a generally linear sidewall profile 206 be utilized to completely conceal the root 202, then the root must be shifted to the far left position 202a. Should a curved shrouded sidewall 206 profile be utilized, then the root 202 may be shifted laterally to the right. For instance, to completely conceal the root 202b on the right, then curved shrouded sidewall profile 206y should be employed. These two combinations of shrouded sidewall 206 and root 202a, and shrouded sidewall 206y and root 202b ensures that a particle traveling along a radial line 53 from the longitudinal axis 51 will not be able to impact the root 202a, 202b without first impacting and rebounding off of either the exposed sidewall 208, 208a, 208b, 208c, or an exposed portion of a convex shrouded sidewall 206y. Similarly, to completely conceal a root 202 using shrouded sidewall 206x, the root 202 would be disposed between the shown roots 202a, 202b. Further, to completely conceal a root 202 using shrouded sidewall 206z, the root 202 would be disposed laterally right of shown root 202b. Regardless of the profile chosen for the shrouded sidewall 206, 206x, 206y, 206z or the root placement 202a, 202b, the exposed sidewall may generally take any profile 208, 208a, 208b, 208c. Though not shown in FIG. 7, either sidewall 206, 208 may also have a spline profile as discussed herein.

While the foregoing description has described flow paths and components as being generally annular or circumferentially disposed, it is understood that the same general flow paths and components may also be utilized in a partial annular configuration, or a non-annular configuration. Referring to FIG. 8, a particle separator 100 is shown wherein any cross-section taken along a plane orthogonal to the direction of flow will yield a substantially rectangular flow path. All component reference numerals in FIG. 8 correspond to the reference numerals used elsewhere and the components are envisioned to work the same. The only difference between FIG. 8 and the previous embodiments is the fact that the embodiment shown in FIG. 8 is not annular.

All features disclosed herein regarding the grooves may vary along their respective lengths. A non-exhaustive and exemplary list of these features may include groove end placement, groove length, groove base, groove height, groove b/h aspect ratio, root placement, sidewall profile, and root and tip radii. Considerations in determining these exact details and how much they vary may depend on factors such as the anticipated operating environment of the turbine, the first wall surface 110 profile, the second wall surface profile, placement of the splitter and first and core flow paths, as well as the air flow requirements for the turbine, the requirements of installation of the separator 100 to an aircraft, and inlet constraints.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain forms of a particle separator have been illustrated and described, it is not limited thereto and instead will only be limited by the claims, appended hereto.

The invention claimed is:

1. A particle separator comprising:
a first end and an opposed second end;
an inlet flow path adjacent said first end, a scavenge flow path adjacent to said second end, and a core flow path adjacent to said second end;
a radially outward wall surface at least partially defining said inlet flow path; and
one or more grooves disposed on at least a portion of said wall surface.

2. The particle separator of claim 1, wherein each of said one or more grooves are axially disposed along a length of said inlet flow path.

3. The particle separator of claim 1, wherein each of said one or more grooves comprises a shrouded sidewall and an exposed sidewall.

4. The particle separator of claim 3, wherein said shrouded sidewall at least partially conceals a root of said groove, wherein said root is connected to both of said shrouded sidewall and said exposed sidewall.

5. The particle separator of claim 3, wherein at least one of said shrouded sidewall and said exposed sidewall have a non-linear profile.

6. The particle separator of claim 5, wherein said non-linear profile varies along said length.

7. The particle separator of claim 1, wherein said one or more grooves comprise a base dimension and a height dimension, wherein there is a ratio between said base dimension and said height dimension, and wherein said ratio varies along a length of said one or more grooves.

8. The particle separator of claim 1, wherein said inlet flow path is annular.

9. The particle separator of claim 1, wherein said inlet flow path is non-annular.

10. A particle separator comprising:
a first end and an opposed second end;
a first wall surface and a second wall surface, wherein said first wall surface extends from said first end to said second end and wherein said second wall surface is adjacent said first end;
an inlet flow path adjacent said first end, a scavenge flow path adjacent to said second end, and a core flow path adjacent to said second end;
a splitter disposed between said scavenge flow path and said core flow path; and
one or more grooves disposed within said inlet flow path and on said first wall surface which defines at least in part a radially outer boundary of said inlet flow path; and
wherein said inlet flow path is defined at least partially by a portion of said first wall surface and at least partially by a portion of said second wall surface.

11. The particle separator of claim 10, wherein each of said one or more grooves are axially disposed along a length of said inlet flow path.

12. The particle separator of claim 10, wherein each of said one or more grooves comprises sidewalls having non-linear profiles.

13. The particle separator of claim 10, wherein said inlet flow path is annular.

14. The particle separator of claim 10, wherein said inlet flow path is non-annular.

15. A particle separator comprising:
a longitudinal axis therethrough;
a generally annular inlet flow path defined at least in part by an outer circumferential surface and an inner circumferential surface;
a generally annular scavenge flow path, and a generally annular core flow path;
a generally circumferential splitter disposed between said scavenge flow path and said core flow path; and
a plurality of grooves disposed within said inlet flow path on at least one of said outer circumferential surface and said inner circumferential surface.

16. The particle separator of claim 15, wherein each of said one or more grooves are axially disposed.

17. The particle separator of claim 15, wherein each of said one or more grooves are axially disposed in an array on said outer circumferential surface.

* * * * *